Dec. 23, 1930.  C. CHAMBERS, JR  1,785,828

VEHICLE SPRING

Filed Sept. 15, 1927

Inventor
Charles Chambers, Jr.
By William W. Deane
his Attorney

Patented Dec. 23, 1930

1,785,828

UNITED STATES PATENT OFFICE

CHARLES CHAMBERS, JR., OF FLORA, INDIANA

VEHICLE SPRING

Application filed September 15, 1927. Serial No. 219,677.

This invention relates to improvements in vehicle springs, and more particularly to the provision of means for use in connection therewith for effectively resisting and absorbing excessive rebounds of the main spring without, however, detracting from the resilient action of the spring under normal conditions.

A further object is the provision of a spring check which, in addition to its action in checking the rebound, will also strengthen the spring itself by securely binding together the outer extremities of the spring leaves and thus evenly distribute the load imposed on the spring over all of the leaves.

A further object of the invention is the provision of a spring check which, by slight variations in the constructions thereof may be either clipped over vehicle springs already in use without the necessity of dismounting them, or, if preferred, may be clipped with the spring onto the axle or other support at the time the spring is applied thereto.

In the accompanying drawings, wherein an improved embodiment of the invention is illustrated, Fig. 1 is a fragmentary side elevation, partly in section, of a vehicle chassis, showing the spring check applied to the chassis supporting spring.

Figure 1:
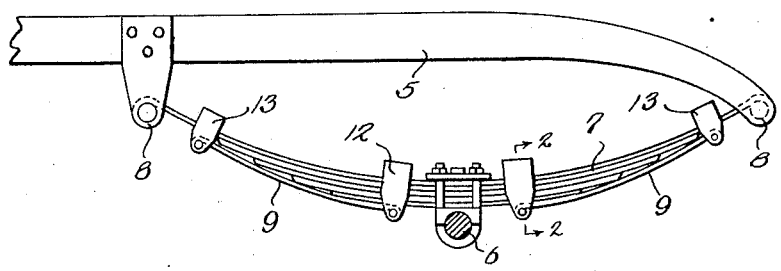

Referring to the drawing in detail, 5 indicates a part of a vehicle chassis, arranged above one of the vehicle axles 6, and supported thereon by a semi-elliptical or other type of spring 7, composed, as usual, of a series of leaves and attached to the chassis by the hangers 8.

Figure 2:
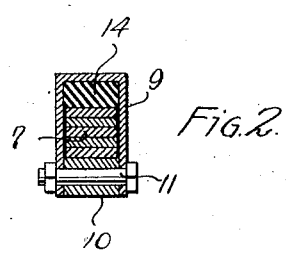
Fig. 2 is transverse section on the line 2—2 of Fig. 1.
Figure 5:
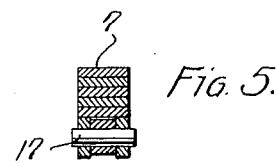
Fig. 5 is a transverse section on the line 5—5 of Fig. 3.

In the form of the invention illustrated in Figs. 1 and 2, each spring clip is composed of the check spring 9 looped at its opposite extremities as indicated at 10 and embracing bolts 11, passing through the open under sides of a pair of clips 12 and 13. The larger clip 12 embraces the leaves of the spring 7 at a point adjacent its mounting upon the axle 6 and a rubber cushion 14 adapted to prevent loose relative movement of the parts is interposed between the web portion of the clip and the top spring leaf. The check spring 9 extends along beneath the spring 7 toward one of the hangers 8 and is arranged in contact with the extremities of the individual spring leaves. The clip 13 is identical in its construction with the clip 12, except that it is of smaller dimensions and embraces but one of the spring leaves 7, that is to say, the master leaf.

In the semi-elliptical type of spring, as shown in Fig. 1, two spring checks are preferably provided, one at each side of the axle 6 so as to exert a uniform checking action on each end thereof. The bolts 11 of the innermost clip 12 act as fulcrums for the check springs 9 when the spring 7 is compressed, the outer clips 13 being carried downwardly relative to the axle 6 by the depressed outer extremities of the spring 7. As the latter returns to its normal position, the check springs 9 oscillate in the opposite direction about the bolts 11, and when the spring 7 is fully restored to normal position, further tendency thereof to rebound, is retarded by the check springs 9 which incident to recoil of the main spring are flexed and the tendency of the main spring to excessively rebound is effectively checked.

Figures 3, 6:
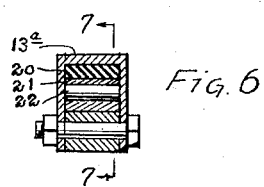
Fig. 3 is a partial side elevation of a chassis showing a modified form of the check.
Fig. 6 is a transverse section on line 6—6 of Fig. 3.
Figure 7:
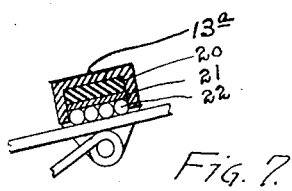
Fig. 7 is a transverse section on line 7—7 of Fig. 6.
Figure 4:
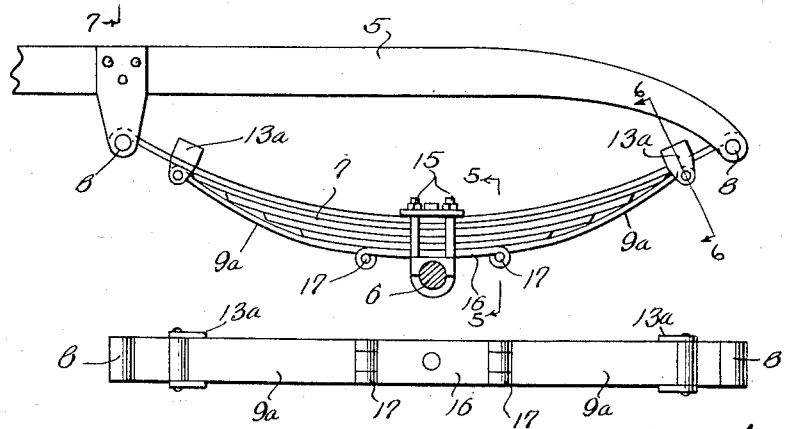
Fig. 4 is a bottom plan view of the modified spring check applied to the spring, but removed from the axle.

The form of the invention illustrated in Fig. 1 is especially adapted for application to vehicle springs where it is undesirable or inconvenient to remove the spring during the installation of the checks, but in Fig. 3 there is shown a form of the invention which is clipped with the main spring 7 directly to the axle 6 by the center spring clip 15.

This form of the invention is constituted by an attaching plate 16 pivotally connected at its extremities as at 17 with the check springs 9ᵃ, the outer extremities of which are connected with the main spring 9 by clips 13ᵃ.

The clips 13ᵃ are provided with recesses to accommodate hard rubber pads 20, steel bearing plates 21 and confined steel rollers 22, preferably four in number, bearing upon the top of the spring leaf, and functioning as anti-friction bearings. The purpose of the rubber pads is to hold the auxiliary leaf to the regular spring and prevent rattle and loose movement of the bearing rollers.

According to this embodiment of the invention, the clip for securing the main spring in position is utilized as a partial mounting for the spring check, and the hinge joints 17 operate in the same manner as the bolts 11 in Fig. 1 to permit such oscillatory movement as may be necessary while the main spring is undergoing deformation.

What I claim is:—

1. In combination, a vehicle part, a vehicle spring secured thereto, an attaching element secured with the spring to said vehicle part, check springs pivotally connected with the attaching part, and underlying the extremities of the leaves of the vehicle spring, and means for attaching the outer extremities of the check spring to the vehicle springs.

2. A spring check including a check spring, and clips carried by the opposite extremities of the check spring adapted to embrace a vehicle spring at different points in the length of the latter, said check spring underlying the extremities of the vehicle spring, cushioning means to absorb relative movement of the clips and vehicle spring, and friction reducing means confined by the clips and adapted to bear upon the upper spring.

3. A spring check including a check spring, and clips carried by the opposite extremities of the check spring adapted to embrace a vehicle spring at different points in the length of the latter, cushioning means to absorb relative movement of the clips and vehicle spring, and friction reducing means confined by the clips and adapted to bear upon the upper spring, each clip including a hollow body receiving the cushioning means and confining the frictioning reducing means in position upon the vehicle spring.

4. A spring check including a check spring, and clips carried by the opposite extremities of the check spring adapted to embrace a vehicle spring at different points in the length of the latter, cushioning means to absorb relative movement of the clips and vehicle spring, friction reducing means confined by the clips and adapted to bear upon the upper spring, each clip including a hollow body receiving the cushioning means and confining the frictioning reducing means in position upon the vehicle spring, and a bearing plate interposed between the cushioning means and the friction reducing means.

5. A spring check including a check spring, and clips carried by the check spring adapted to embrace a vehicle spring at different points in the length of the latter, each clip including a hollow body in which is located a hard rubber pad, a steel bearing plate, and steel rollers positioned upon the vehicle spring.

In testimony whereof I affix my signature.

CHARLES CHAMBERS, Jr.